United States Patent Office 3,181,609
Patented May 4, 1965

3,181,609
OIL RECOVERY PROCESS
Albert K. Csaszar, Dundee, and George G. Bernard, Crystal Lake, Ill., assignors to The Pure Oil Company, Chicago, Ill., a corporation of Ohio
No Drawing. Filed Nov. 6, 1961, Ser. No. 150,152
4 Claims. (Cl. 166—9)

This invention relates to an improved method for the recovery of petroleum from underground reservoirs. More particularly, this invention relates to a miscible-dry process by which greater quantities of petroleum can be economically recovered.

The prior art recognizes various secondary-recovery techniques by which additional quantities of oil can be recovered from depleted reservoirs. The most commonly used such technique is the well-known waterflood. The prior art further recognizes that the efficiency of such floods can be improved by employing one or more solvents which are injected into the reservoir prior to the injection of floodwater. Morse et al., U.S. Patent No. 2,742,089, for example, discloses a method in which a hydrocarbon solvent is first injected into the reservoir, followed by an amphipathic solvent which is defined by Morse as being soluble in, and preferably completely miscible with, both oil and water, and, finally, floodwater is injected to drive the solvent banks through the formation towards a producing well.

Miscible-flood methods, such as disclosed by Morse et al, have been shown to provide a high degree of recovery efficiency when the amphipathic solvent employed is in fact miscible with both the oil to be recovered and the subsequently injected floodwater. While the injection of a low-molecular-weight hydrocarbon before the amphipathic solvent tends to decrease the viscosity of the petroleum and improve the sweep efficiency of the process, still the amphipathic solvent must be miscible with both the oil in the reservoir and the floodwater if high recovery efficiencies are to be obtained.

Unfortunately, there are very few materials which are miscible with both oil and water, or even very soluble in both oil and water, which can be used as the amphipathic solvent. The few suitable solvents which are available are so expensive as to render their use impractical in secondary recovery operation. Some solvents are miscible with the petroleum in the reservoir but are only slightly soluble in water, in which case excellent oil recoveries can be obtained but a very large slug of solvent must be employed, and most of the solvent will remain in the reservoir and become lost. Since the solvent is more expensive than the petroleum recovered, such methods are obviously unattractive. On the other hand, solvents such as methanol and ethanol, which are miscible with water but have only limited solubility in petroleum, provide recovery of only a small portion of the petroleum in the reservoir, although most of the solvents themselves will be recovered in the course of the flood. A few solvents, such as tertiary butyl alcohol, produce excellent oil recoveries and can themselves be recovered by the waterflood, but these solvents are unattractively expensive.

It is a primary object of this invention to provide an improved secondary-recovery process by which additional quantities of oil may be recovered. Yet another object of this invention is to provide an improved secondary-recovery process by which a greater portion of the solvent employed may be recovered. Still another object of this invention is to provide a secondary-recovery process in which amphipathic solvents of moderate cost may be employed.

Briefly, in accordance with this invention a slug of oil containing a small amount of oil-soluble surfactant is first injected through an input well into a reservoir. A second slug of a water-miscible, oxygenated hydrocarbon solvent is then injected into the reservoir, and followed by floodwater. Petroleum is recovered from one or more producing wells. The following block diagram will graphically illustrate the foregoing:

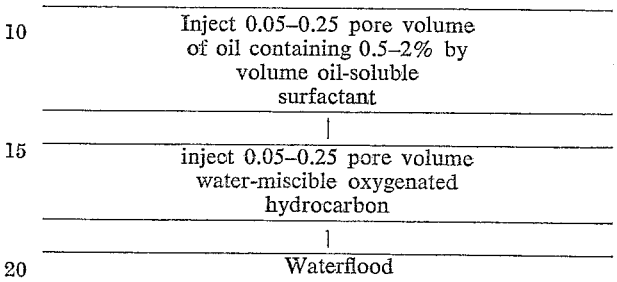

In carrying out the process of this invention, various hydrocarbon oils may be employed as the first-injected slug. It is especially preferred to use an oil having approximately the same viscosity, or slightly lower viscosity, than the oil to be recovered. Previously recovered crude oil may be employed, and for reasons of economics is a preferred material. Other suitable hydrocarbons are natural gasolines, refined oils of moderate viscosity, naphtha fractions, or the like. The second-injected slug consist of a water-miscible oxygenated hydrocarbon, which has some solubility in crude oil. Suitable oxygenated hydrocarbons include methyl alcohol, ethyl alcohol, isopropyl alcohol, dimethyl and ethyl methyl ketone, and acetic acid. Especially preferred are methyl alcohol, ethyl alcohol, and isopropyl alcohol, because of their low cost. The raw oxidation products of various hydrocarbon partial oxidation processes can also be employed. Such product streams comprise a water-miscible mixture of various partially oxygenated materials.

The first-injected hydrocarbon can be in the amount of 0.05 to 0.25 reservoir pore volume, and contain in solution 0.5 to 2.0% by volume of an oil-soluble surfactant. The water-soluble oxygenated hydrocarbon is injected in the amount of 0.05 to 0.25 reservoir pore volume. Floodwater is then injected and petroleum is recovered from a producing well until the water-to-oil ratio at the producing well approaches an economically impractical value. At this point the process is terminated.

The efficiency of the method of this invention has been demonstraed by a series of experimental floods conducted in packed sand cores having a length of one foot and a diameter of two inches. The cores varied slightly in porosity, but all had a pore volume of about 128 to 131 cubic centimeters. Throughout the experiments, injection pressures and rates of flood advance were approximately uniform. At the beginning of each run, the core contained oil in the amount indicated; the remaining voids of the core were filled with water which, in each case, was the mobile phase in the core. Conditions were uniform throughout the tests as nearly as practical, except as noted.

In the first four runs, the oil in place in the cores was a 7-centipoise refined oil. In Run 5, Dollarhide crude oil was employed. In each experiment, the oil slug injected consisted of the same oil which was in place in the core subjected to flood. In each run except Run 2, the injected oil slug contained two percent by volume of Triton X–45, a commercial oil-soluble surfactant. In each run except Run 4, the indicated amount of oil was injected and followed by a slug of isopropyl alcohol, which was followed by floodwater. In Run 4, the oil and isopropyl alcohol were mixed prior to injection, and the mixture was injected as one slug.

In Runs 1 and 5, injection of water was continued to ultimate oil recovery, i.e., until no additional oil appeared in the core effluent. In Runs 2, 3, and 4, floodwater was injected in the amount of 2 pore volumes, at which point the test was discontinued.

*Table I*

| Run No. | Oil in Place | Oil Saturation at start of Run (percent P.V.) | Oil Slug Injected (percent P.V.) | Isopropanol Slug Injected (percent P.V.) | Total Solvent Injected (percent P.V.) | Oil Produced (percent O.I.P.) |
|---|---|---|---|---|---|---|
| 1 | 7-CP Oil | 26.7 | | 56.4 | 56.5 | 66 |
| 2 | 7-CP Oil | 23.4 | 19.6 | 23.4 | 43.0 | 55 |
| 3 | 7-CP Oil | 21.1 | 19.6 | 23.4 | 43.0 | 100 |
| 4 | 7-CP Oil | 28.5 | 19.3 | 23.0 | 42.3 | 41 |
| 5 | Dollarhide Crude. | 21.3 | 50.0 | | 50.0 | 92 |

The oil produced in each experiment expressed as a percentage of the oil initially in place, was determined by measuring the total amount of oil in the effluent from the core, subtracting from this the volume of the oil slug injected, and expressing the remainder as a percentage of the oil initially in place.

The high efficiency of recovery of the process of this invention is demonstrated by the results of Run 3. In comparison, in Run 1, wherein a volume of isopropyl alcohol greater than the total volumes of oil and alcohol in Run 3 was injected, the recovery was much less. In Run 2, wherein quantities of oil and isopropyl alcohol identical to those of Run 3 were injected, but no oil-soluble surfactant was incorporated in the oil slug, the efficiency of the process was very greatly reduced. In Run 4, wherein the alcohol and the oil slug with surfactant were injected as a mixture, very poor results were obtained. In Run 5, wherein a surfactant-containing slug alone was injected and followed by floodwater, surprisingly good results were obtained, but even so, the results were far inferior to those obtainable by the process of this invention.

As a specific example, a petroleum reservoir containing crude oil and connate water, in relative volume proportions of 30-to-70, is provided with five wells arranged in five-spot flood pattern. The petroleum in the reservoir has a viscosity of about five centipoises, and the water in the reservoir, which contains some salt, is the mobile phase because the reservoir has been subjected to a prior conventional waterflood. The reservoir is treated in accordance with this invention by injecting through the central well of the five-spot pattern 0.06 reservoir pore volume of recovered crude oil in which is dissolved 1% by weight of Triton X-45. Ethyl alcohol in the amount of 0.06 pore volume is then injected, and floodwater is injected to drive the oil and alcohol slugs towards the four producing wells, from which petroleum is recovered. Petroleum is recovered from the four producing wells until the water-to-oil ratio reaches a value of 5-to-1, at which point 83% of the petroleum initially in the reservoir has been recovered.

While the invention has been described with reference to a specific oil-soluble surfactant, any oil-soluble surfactant which is not in itself incompatible with reservoir constituents can be used. Such surfactants may be selected from well-known tables which list commercially available surfactants, their chemical composition, and their physical and surface-active properties. The flood may be carried out as a five-spot pattern, as a line drive, or as other conventional flooding patterns. The rate of flood advance is not critical, but it is preferred that rates of advance of about 1 to 2 feet per day be employed.

The embodiments of the invention in which an exclusive property or privilege is claimed are defined as follows:

1. The method of recovery of petroleum from underground reservoirs penetrated by an input well and a producing well comprising injecting through said input well into said reservoir about 0.05 to 0.25 reservoir pore volume of a normally liquid hydrocarbon oil, having a viscosity approximately the same as said petroleum, in which is dissolved about 0.5 to 2.0 percent by volume of a predominantly oil-soluble surfactant, then injecting about 0.05 to 0.25 reservoir pore volume of a water-miscible oxygenated hydrocarbon, driving said injected oil and oxygenated hydrocarbon toward said producing well by the injection of floodwater, and recovering petroleum from said producing well.

2. The method in accordance with claim 1 in which said oil is crude oil.

3. The method in accordance with claim 2 in which said oxygenated hydrocarbon is of the group consisting of methanol, ethanol, and isopropanol.

4. The method in accordance with claim 3 in which said oil and said oxygenated hydrocarbon are each injected in the amount of 0.05 reservoir pore volume.

References Cited by the Examiner
UNITED STATES PATENTS

| 2,742,089 | 4/56 | Morse | 166—9 |
| 2,851,105 | 9/58 | Garst | 166—42 |
| 2,920,041 | 1/60 | Meadors | 166—9 X |
| 3,082,822 | 3/63 | Holm | 166—9 |

CHARLES E. O'CONNELL, *Primary Examiner.*

NORMAN YUDKOFF, *Examiner.*